United States Patent [19]

Svensson et al.

[11] 4,154,488

[45] May 15, 1979

[54] TRACTION DEVICE FOR CROSS-COUNTRY VEHICLES AND MACHINES

[75] Inventors: Assar Svensson, Ersmark; Gustaf Hultdin, Malå, both of Sweden

[73] Assignees: SKEGA Aktiebolag; Hultdins Verkstads AB, both of Sweden

[21] Appl. No.: 841,503

[22] Filed: Oct. 12, 1977

[30] Foreign Application Priority Data

Oct. 11, 1976 [SE] Sweden .............................. 7611257

[51] Int. Cl.² ............................................. B62D 55/12
[52] U.S. Cl. ..................................... 305/10; 301/48; 305/15; 305/57
[58] Field of Search ...................... 301/49, 48; 305/10, 305/57, 15, 19, 60; 180/9.26, 9.28

[56] References Cited

U.S. PATENT DOCUMENTS

| 1,849,678 | 3/1932 | Martin | 301/48 |
| 3,113,805 | 12/1963 | Nodwell | 305/15 |
| 3,239,277 | 3/1966 | Beck | 301/49 X |

FOREIGN PATENT DOCUMENTS

| 254577 | 8/1927 | Italy | 305/57 |
| 126754 | 6/1959 | U.S.S.R. | 305/57 |

*Primary Examiner*—John P. Shannon
*Attorney, Agent, or Firm*—Townsend and Townsend

[57] ABSTRACT

A cross-country vehicle includes a wheel provided with an outer layer of resilient material having a plurality of circumferentially disposed protruding teeth. A track is provided about the wheel and has a plurality of transverse bars connected to one another and separated by gaps which engage the protruding teeth. Studs moveably mounted in radial holes through at least some of the teeth of the wheel project downwardly to extend through the gaps and into engagement with the ground.

4 Claims, 2 Drawing Figures

TRACTION DEVICE FOR CROSS-COUNTRY VEHICLES AND MACHINES

BACKGROUND OF THE INVENTION

This invention relates to a device incorporated in the wheels of cross-country vehicles and machines, for example for forestry, which is capable of increasing the grip necessary for advancing the vehicle or machine when increased traction is required.

Due to the ever increasing mechanization of forestry in recent times, not only the number of machines used in forestry and agriculture has increased, but in many cases also the size and weight of the machines have increased, in spite of the fact that so far no solution has been found of how to cope with the problem of damages caused on soil and growing trees, and particularly on the root system of the latter, by said machines, especially when they are advanced on bare ground. Forestry vehicles at present are driven either by means of large wheels equipped with profiled tires and suspended in a bogie structure or by means of steel tracks in combination with such profiled tires. Compared with profiled tires alone, which produce a high local surface pressure and have poor bearing capacity, so that the machine easily will sink down into the soil and form remaining furrows, especially when the soil is relatively weak, the use of steel tracks in combination with profiled tires has resulted in an improved grip and a wider spread of load and force, whereby the feasibility of using such vehicles on weak soils is enhanced. Steel tracks, however, have proved relatively aggressive and by their structure to expose the soil to heavy point loads, which give rise to damages of growing trees, particularly their root systems, and leaves furrows in the soil, especially when the vehicle is skidding, i.e. when the grip is not sufficient for the forces required for advancing the vehicle. A further disadvantage of steel tracks is that they must be removed every time the vehicle is to be driven on a paved road. Steel tracks, moreover, when they come into contact with stones and the like give rise to sparks, which can cause forest fires.

It is known that the aforesaid damages to a great extent can be reduced substantially when instead of tracks of steel, tracks of rubber, with or without steel reinforcements, are used. Experiments made with such rubber tracks, however, have not shown satisfactory results. It was found among other problems that solid-rubber tracks, due to the great forces required for advancing forestry machines, stretch too much and thereby give rise to sliding between track and drive wheel. Even rubber tracks with built-in steel reinforcements proved unsatisfactory from a strength point of view, especially when the vehicles are driven up-grade or on soil with difficult surface structure where great traction forces are required.

The present invention has the object, among others, of rendering possible the use of rubber tracks, with or without built-in steel reinforcements, even for cross-country vehicles and machines, for example in forestry, and to produce a device incorporated in the wheels of such vehicles and machines, which is so constructed that, if required, the grip can be increased, more precisely so that the increase in traction forces caused by such increase in grip does not affect a track provided about the wheel.

BRIEF DESCRIPTION OF THE DRAWINGS

The invention is described in the following in greater detail with reference to the accompanying drawings, in which.

DESCRIPTION OF THE PREFERRED EMBODIMENT

Figure 1:
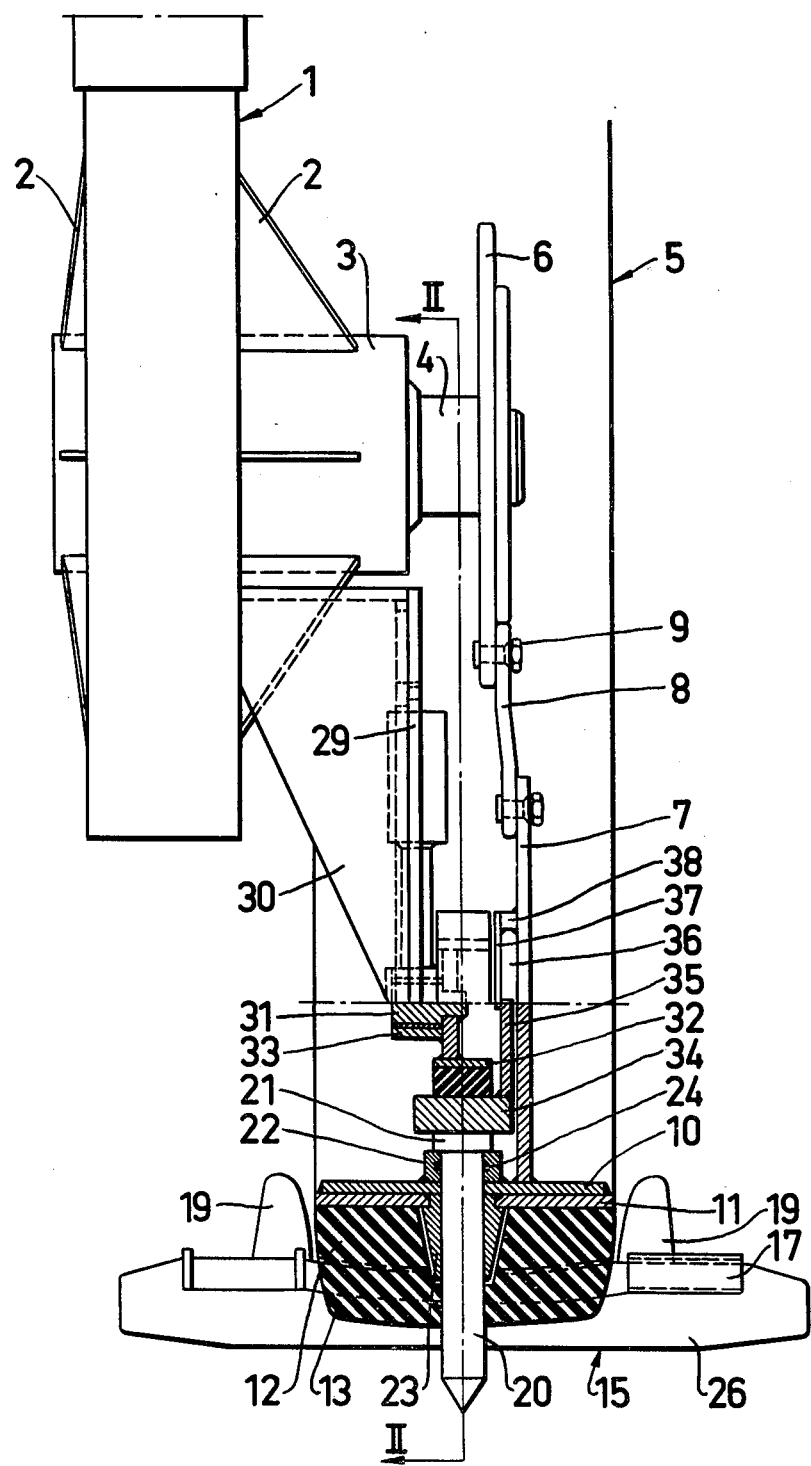
FIG. 1 is an end view of a portion of an embodiment of the device according to the invention shown by way of example, with a section along the line I—I in FIG. 2 laid therein.

In the drawings, the reference number 1 designates in general a carrying arm, which is shown in the form of a so-called bogie box, and which is provided with a bearing sleeve 3 for a wheel axle 4 of a wheel 5. Said bearing sleeve is stayed on both sides of the carrying arm 1 by means of stay-sheets 2. Said wheel 5, which is shown only partially, can be a driven wheel or a so-called following wheel. It comprises a rim, which consists of a center portion 6 connected to the wheel axle 4, an outer ring 7, which through an intermediate ring 8 by means of bolts 9 is detachably connected to the center portion, and a wheel cover 10 rigidly connected to the outer ring 7. The wheel further comprises a rubber ring 12 vulcanized on an annular support plate 11, which is rigidly connected to the wheel cover 10, for example by welding or by means of bolts (not shown) or in some other way known per se. In the embodiment shown, the rubber ring 12 is formed with teeth 13 intended to engage in tooth gaps 14 of a rubber track 15 provided about the wheel and shown composed of track elements 16 hingedly assembled with each other by hinge pins 17 arranged on both sides of each tooth gap 14.

Each track element 16 is shown to consist of rubber, which may but need not be of the same hard rubber type as the rubber in the rubber ring 12 of the wheel, with steel reinforcements 18 vulcanized especially in the areas coming into contact with the rubber ring 12 and its teeth 13. 19 designates lateral tongues located on the track on both sides of the wheel 1 for guiding the track in lateral direction. Above and in the drawing a special hinged rubber track assembled of track elements has been described and shown, but of course every other vehicle track of rubber with or without steel reinforcements which is known per se and suitable for this purpose can be used.

Figure 2:
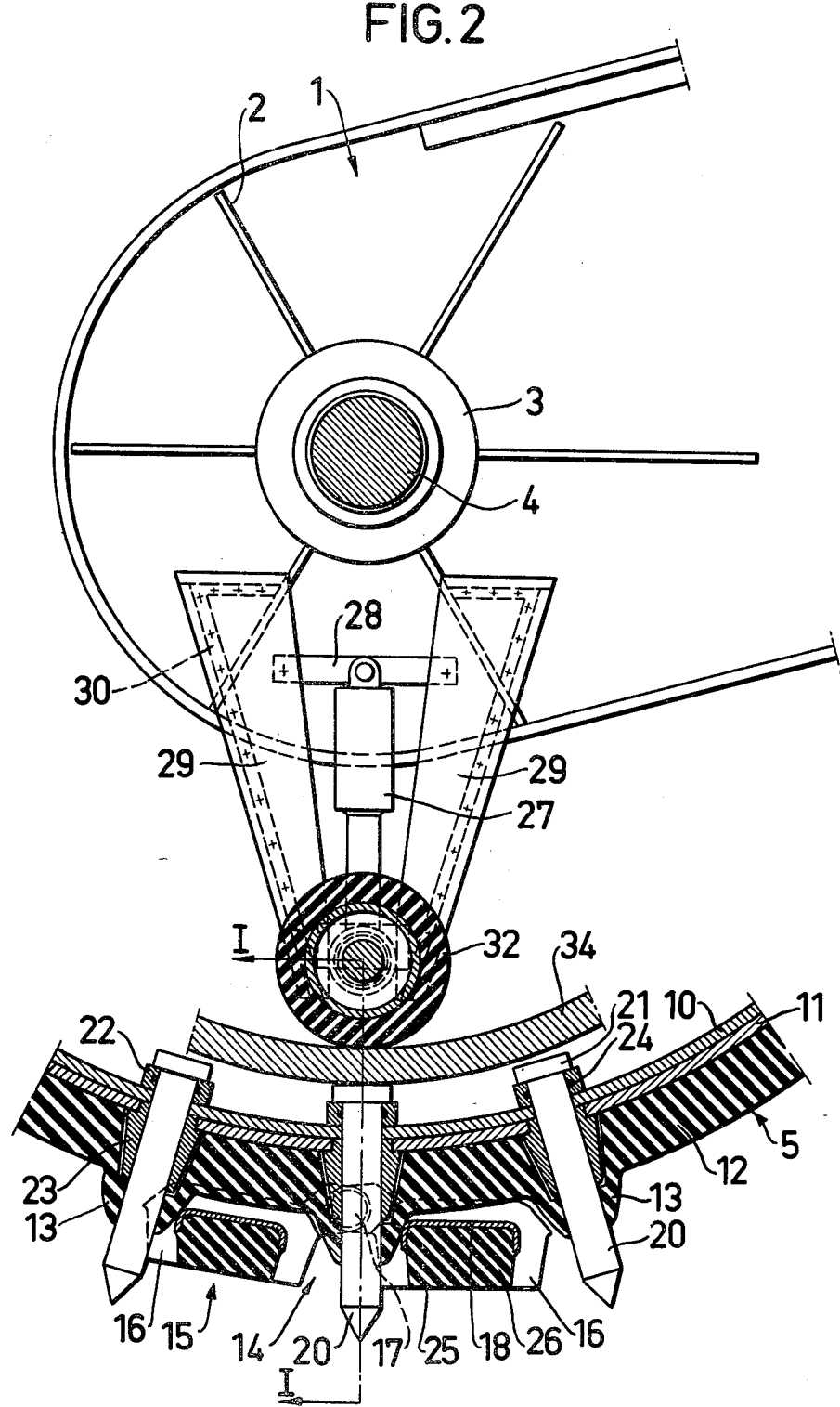
FIG. 2 is a section along the line II—II in FIG. 1.

In every tooth 13 a preferably sharp-pointed and longitudinally movable stud 20 of steel, cemented carbide or other equivalent material is provided. Said studs are provided with a head 21 adapted to act as a pressure plate and as a stop for limiting the stud movement in the direction away from the wheel center. When the stud is in its entirely projected position as shown, the head 21 abuts a supporting sleeve 22, which is attached to the inside of the wheel cover 10, and through which the stud extends together with a support and guide sleeve 23 for the stud, which sleeve 23 is made of steel or another material and provided at the supporting ring 11 of the rubber ring. Said sleeve 23 may have conic outer configuration and such a radial extension from the supporting ring 11, that it extends into the tooth 13 proper. The sleeves 23 preferably are not connected at their outer surface to the rubber in the rubber ring, but a certain space should exist therebetween as shown in the Figures. After the support and guide sleeve 23, the stud extends through a hole in the tooth 13 with such a diameter, that the stud is tightly enclosed, so that the stud cannot freely move in its longitudinal direction, and dirt and the like are prevented from penetrating between the stud and the surrounding surfaces and causing an undesired increase in friction. For the same purpose, a sealing ring 24 may also be provided in the supporting sleeve 22. Every stud 20 has such a length that in its entirely projected position shown in the Figures the stud extends substantially past the track surfaces 25 contacting the soil, so as in this position to penetrate into the soil between carrying bars 26 defining a tooth gap 14 and thereby to increase the grip, independently of the track, which thereby is not exposed to the higher traction forces which the improved grip has rendered possible. For pushing or pressing out the studs 20 when required, a preferably hydraulic piston-cylinder means 27 is provided which is operated from the driver's seat of the vehicle or machine. Said piston-cylinder means is hingedly suspended at one end on a cross-stay 28 provided between two guide plates 29 located on both sides of the piston-cylinder means and attached by screwing to brackets 30 supported by the carrying arm 1. Said piston-cylinder means 27 is at its other end provided with a pivot 31 carrying a pressure roll 32. The pivot may be supported in a bearing sleeve 33 connected to the piston-cylinder means 27, as shown in the Figures, or it may be directly connected to said means, in which case the roll 32 is mounted on the pivot 31. About the wheel axle 4 and restrictedly movable in a plane in parallel with, for example, the center portion 6 of the rim, a pressure ring 34 is provided which extends between the roll 32 and the stud heads 21, and which preferably is suspended centered in relation to the wheel center by means of rubber strips or other means (not shown), which permit the restricted movement of the pressure ring in said plane. Said pressure ring 34 is retained in its plane by means of a flange 35 extending into a groove 36, which is defined by the outer ring 7 of the rim and by caps 37 attached to said ring 7 by means of distance members 38. Though not shown, the caps 37 should be detachably attached, for example by screwing on the outer ring 7 of the rim, so that the pressure ring 34 can be removed, for example for exchange. The pressure ring 34, thus is movable to a certain restricted extent and intended to co-operate with the roll 32 of the piston-cylinder means 27. By action of the piston-cylinder means 27, thus, the pressure ring can be moved radially outwards, thereby actuating the studs 20 and pressing the same radially outwards to the position shown in FIGS. 1 and 2 in order if required to increase the grip. Upon return of the piston-cylinder means 27 to its rearward end position, the projecting studs will be pressed in by the soil pressure and are then retained in said pressed-in position by the friction between the studs and the surrounding surfaces. When again increased grip is required, the studs again can be pressed outward by the piston-cylinder means 27. The studs, owing to their movability, automatically are pressed inward when they are not exposed to pressure from the piston-cylinder means and do not at all affect the ground. Vehicles equipped with the device according to the invention, therefore, can be driven also on general road. As both the track and the wheel ring can be made of rubber, also the risk of spark formation is reduced very substantially compared with the conventional tracks for forestry machines.

The present invention is not restricted to the embodiment described above and shown in the drawings, but can be altered and modified in many different ways within the scope of the invention. It is, for example, possible to use the device also in wheels, which are not intended to co-operate with tracks, in which case, for example, the teeth 13 may have the form of carrying bars or the like, with the studs arranged in said bars.

What we claim is:

1. A device for increasing the grip necessary for advancing a cross country vehicle, for example for use in forestry, in which the vehicle includes a wheel provided with an outer layer of resilient material having a plurality of circumferentially disposed, protruding teeth, and a track provided about the wheel and having a plurality of transverse bars connected to one another and separated by gaps engaged by the protruding teeth of the resilient material, said device comprising radial holes provided through at least some of the teeth, said holes being aligned with respective gaps between the bars of the track when the track is in contact with the wheel, studs moveably mounted in the respective holes, means for actuating the studs projecting downwardly so that said downwardly projecting studs extend radially outwardly through the gaps between the bars for engagement with the ground, and when not actuated by said means move radially inwardly within the outer periphery of the bars.

2. A device according to claim 1 wherein said means for actuating the studs comprises a piston-cylinder means and a pressure ring located between the studs and a pressure roll supported by said piston-cylinder means, which pressure ring is movable in a plane perpendicular to the wheel axle.

3. A device according to claim 1 wherein every stud is provided with a head for limiting the projecting length of the stud by abutting a supporting sleeve which is inside of said outer layer of resilient material.

4. A device according to claim 1 wherein every stud is guided in a sleeve provided in the outer layer of resilient material without being connected thereto.

* * * * *